US012768020B2

(12) United States Patent
Perlade et al.

(10) Patent No.: US 12,768,020 B2
(45) Date of Patent: *Oct. 20, 2026

(54) COLD ROLLED, ANNEALED AND TEMPERED STEEL SHEET AND METHOD OF MANUFACTURING THE SAME

(71) Applicant: ArcelorMittal, Luxembourg (LU)

(72) Inventors: Astrid Perlade, Le Ban-Saint-Martin (FR); Kangying Zhu, Metz (FR); Coralie Jung, Metz (FR); Michael Stoltz, Maizieres-les-Metz (FR)

(73) Assignee: ArcelorMittal, Luxembourg (LU)

( * ) Notice: Subject to any disclaimer, the term of this patent is extended or adjusted under 35 U.S.C. 154(b) by 750 days.

This patent is subject to a terminal disclaimer.

(21) Appl. No.: 18/016,837

(22) PCT Filed: Jul. 12, 2021

(86) PCT No.: PCT/IB2021/056245
§ 371 (c)(1),
(2) Date: Jan. 18, 2023

(87) PCT Pub. No.: WO2022/018569
PCT Pub. Date: Jan. 27, 2022

(65) Prior Publication Data

US 2023/0295782 A1 Sep. 21, 2023

(30) Foreign Application Priority Data

Jul. 24, 2020 (WO) .................. PCT/IB2020/057008

(51) Int. Cl.
*C22C 38/14* (2006.01)
*B32B 7/05* (2019.01)
(Continued)

(52) U.S. Cl.
CPC ................ *C22C 38/14* (2013.01); *B32B 7/05* (2019.01); *B32B 15/011* (2013.01); *C21D 6/005* (2013.01);
(Continued)

(58) Field of Classification Search
CPC ... B32B 15/011; B32B 7/05; C21D 2211/001; C21D 2211/005; C21D 6/005;
(Continued)

(56) References Cited

U.S. PATENT DOCUMENTS 10,633,727 B2 4/2020 Garza-Martinez et al.
11,965,225 B2 * 4/2024 Jung .................... C21D 8/0226
(Continued)

FOREIGN PATENT DOCUMENTS

CN 106011418 A 10/2016
CN 107858586 A 3/2018
(Continued)

OTHER PUBLICATIONS

Search Report of PCT/IB2021/056233 dated Oct. 8, 2021 and International Report on Patentability.
(Continued)

*Primary Examiner* — Jie Yang
(74) *Attorney, Agent, or Firm* — Davidson Kappel LLC

(57) ABSTRACT

A cold rolled, annealed and partitioned steel sheet, made of a steel having a composition including, by weight percent: C: 0.05-0.18%, Mn: 6.0-11.0%, Mo: 0.05-0.5%, B: 0.0005-0.005%, S≤0.010%, P≤0.020%, N≤0.008%, and including optionally one or more of the following elements, in weight percentage: Al<3%, Si≤1.20%, Ti≤0.050%, Nb≤0.050%, Cr≤0.5%, V≤0.2%, the remainder of the composition being iron and unavoidable impurities resulting from the smelting, said steel sheet having a microstructure including, in surface fraction, from 0% to 30% of ferrite, such ferrite, when
(Continued)

present, having a grain size below 1.0 μm, from 8% to 40% of retained austenite, the fraction of austenite islands with a size above 0.5 μm being below or equal to 5% from 30 to 92% of partitioned martensite less than 3% of fresh martensite, a carbon $[C]_A$ and manganese $[Mn]_A$ content in austenite, expressed in weight percent, such that the ratio $([C]_A^2 \times [Mn]_A)/(C\,\%^2 \times Mn\,\%)$ is below 18.0, C % and Mn % being the nominal values in carbon and manganese in weight %.

18 Claims, 2 Drawing Sheets

(51) Int. Cl.

| | |
|---|---|
| ***B32B 15/01*** | (2006.01) |
| ***C21D 6/00*** | (2006.01) |
| ***C21D 8/02*** | (2006.01) |
| ***C21D 8/0221*** | (2026.01) |
| ***C21D 8/0247*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***F16B 5/08*** | (2006.01) |

(52) U.S. Cl.

CPC ............ *C21D 8/02* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *F16B 5/08* (2013.01)

(58) Field of Classification Search

CPC .... C21D 6/008; C21D 8/0205; C21D 8/0236; C21D 8/0436; C21D 9/46; C22C 38/02; C22C 38/04; C22C 38/06

See application file for complete search history.

(56) References Cited

U.S. PATENT DOCUMENTS

| | | | | |
|---|---|---|---|---|
| 2016/0312323 | A1 | 10/2016 | Rana et al. | |
| 2017/0081741 | A1 | 3/2017 | Tabata et al. | |
| 2018/0305785 | A1 | 10/2018 | Nakagawa et al. | |
| 2018/0363088 | A1 | 12/2018 | Tsuzumi et al. | |
| 2018/0371566 | A1 | 12/2018 | Gospodinova et al. | |
| 2019/0106760 | A1 | 4/2019 | Yamashita et al. | |
| 2020/0010915 | A1 | 1/2020 | Oh et al. | |
| 2020/0347471 | A1 | 11/2020 | Zhu et al. | |
| 2020/0362432 | A1 | 11/2020 | Jung et al. | |
| 2021/0087646 | A1 | 3/2021 | Jung et al. | |
| 2021/0317554 | A1 | 10/2021 | Ryu et al. | |
| 2022/0002847 | A1 | 1/2022 | Krizan et al. | |
| 2023/0287548 | A1* | 9/2023 | Perlade | C22C 38/04 |
| 2023/0295781 | A1* | 9/2023 | Perlade | C21D 8/0236 403/271 |

FOREIGN PATENT DOCUMENTS

| | | | | |
|---|---|---|---|---|
| CN | 110066964 | A | 7/2019 | |
| CN | 111218621 | A | 6/2020 | |
| CN | 111373061 | A | 7/2020 | |
| EP | 3336212 | A1 | 6/2018 | |
| EP | 3492618 | A1 | 6/2019 | |
| JP | H05230530 | A | 9/1993 | |
| JP | 2009256773 | A | 11/2009 | |
| JP | 2015151576 | A | 8/2015 | |
| JP | 2019014933 | A | 1/2019 | |
| JP | 2019039037 | A | 3/2019 | |
| JP | 2021507994 | A | 2/2021 | |
| KR | 20040059293 | A | 7/2004 | |
| KR | 20050032721 | A | 4/2005 | |
| KR | 20170075853 | A | 7/2017 | |
| KR | 101819345 | B1 | 1/2018 | |
| KR | 10-20180021161 | A | 2/2018 | |
| KR | 20200024398 | A | 3/2020 | |
| WO | WO2015182596 | A1 | 12/2015 | |
| WO | WO2017068757 | A1 | 4/2017 | |
| WO | WO2017183349 | A1 | 10/2017 | |
| WO | WO 2017/212885 | A1 | 12/2017 | |
| WO | WO2018054787 | A1 | 3/2018 | |
| WO | WO2019122961 | A1 | 6/2019 | |
| WO | WO-2019123240 | A2 * | 6/2019 | C22C 38/38 |
| WO | WO 2019123245 | A1 | 6/2019 | |
| WO | WO 2019134102 | A1 | 7/2019 | |
| WO | WO 2019155014 | A1 | 8/2019 | |
| WO | WO2020011638 | | 1/2020 | |
| WO | WO2020050573 | A1 | 3/2020 | |
| WO | WO 2022/018562 | A1 | 1/2022 | |
| WO | WO 2022/018563 | A1 | 1/2022 | |
| WO | WO 2022/018565 | A1 | 1/2022 | |
| WO | WO 2022/018566 | A1 | 1/2022 | |
| WO | WO 2022/018567 | A1 | 1/2022 | |
| WO | WO 2022/018568 | A1 | 1/2022 | |
| WO | WO 2022/018569 | A1 | 1/2022 | |
| WO | WO 2022/018571 | A1 | 1/2022 | |

OTHER PUBLICATIONS

Search Report of PCT/IB2021/056243 dated Oct. 8, 2021 and International Report on Patentability.

Search Report of PCT/IB2021/056235 dated Sep. 8, 2021 and International Report on Patentability.

Search Report of PCT/IB2021/056241 dated Oct. 4, 2021 and International Report on Patentability.

Search Report of PCT/IB2021/056237 dated Aug. 4, 2021 and International Report on Patentability.

Search Report of PCT/IB2021/056245 dated Aug. 4, 2021 and International Report on Patentability.

Search Report of PCT/IB2021/056244 dated Aug. 24, 2021 and International Report on Patentability.

Search Report of PCT/IB2021/056247 dated Oct. 4, 2021 and International Report on Patentability.

Lee et al.: "Observation of the TWIP + TRIP Plasticity-Enhancement Mechanism in Al-Added 6 Wt Pct Medium Mn Steel," Metallurgical and Materials Transactions A, vol. 46A, Jun. 2015, 2356-2363.

* cited by examiner

COLD ROLLED, ANNEALED AND TEMPERED STEEL SHEET AND METHOD OF MANUFACTURING THE SAME

The present invention relates to a high strength steel sheet having good weldability properties and to a method to obtain such steel sheet.

BACKGROUND

To manufacture various items such as parts of body structural members and body panels for automotive vehicles, it is known to use sheets made of DP (Dual Phase) steels or TRIP (Transformation Induced Plasticity) steels.

SUMMARY OF THE INVENTION

One of the major challenges in the automotive industry is to decrease the weight of vehicles in order to improve their fuel efficiency in view of the global environmental conservation, without neglecting the safety requirements. To meet these requirements, new high strength steels are continuously developed by the steelmaking industry, to have sheets with improved yield and tensile strengths, and good ductility and formability.

One of the developments made to improve mechanical properties is to increase content of manganese in steels. The presence of manganese helps to increase ductility of steels thanks to the stabilization of austenite. But these steels present weaknesses of brittleness. To overcome this problem, elements as boron are added. These boron-added chemistries are very tough at the hot-rolled stage but the hot band is too hard to be further processed. The most efficient way to soften the hot band is batch annealing, but it leads to a loss of toughness.

In addition to these mechanical requirements, such steel sheets have to show a good resistance to liquid metal embrittlement (LME). Zinc or Zinc-alloy coated steel sheets are very effective for corrosion resistance and are thus widely used in the automotive industry. However, it has been experienced that arc or resistance welding of certain steels can cause the apparition of particular cracks due to a phenomenon called Liquid Metal Embrittlement ("LME") or Liquid Metal Assisted Cracking ("LMAC"). This phenomenon is characterized by the penetration of liquid Zn along the grain boundaries of underlying steel substrate, under applied stresses or internal stresses resulting from restraint, thermal dilatation or phases transformations. It is known that adding elements like carbon or silicon are detrimental for LME resistance.

The automotive industry usually assesses such resistance by limiting the upper value of a so-called LME index calculated according to the following equation:

$$\text{LME index} = C\,\% + Si\,\%/4,$$

wherein C % and Si % stands respectively for the weight percentages of carbon and silicon in the steel.

The publication WO2020011638 relates to a method for providing a medium and intermediate manganese (Mn between 3.5 to 12%) cold-rolled steel with a reduced carbon content. Two process routes are described. The first one concerns an intercritical annealing of the cold rolled steel sheet. The second one concerns a double annealing of the cold rolled steel sheet, the first one being fully austenitic, the second one being intercritical. Thanks to the choice of the annealing temperature, a good compromise of tensile strength and elongation is obtained. By lowering annealing temperature an enrichment in austenite is obtained, which implies a good fracture thickness strain value. But the low amount of carbon and manganese used in the invention limits the tensile strength of the steel sheet to values not higher than 980 MPa.

An object of the present invention is to provide a steel sheet having a combination of high mechanical properties with a tensile strength TS above or equal to 1270, a uniform elongation UE above or equal to 10.0%, a total elongation TE above or equal to 14.0%, a hole expansion ratio of at least 15% and satisfying the equation (TS×TE)/(C %+Si %/4)>50 000 MPa. %, wherein C % and Si % refer to the nominal wt % in C and Si of the steel.

Preferably the steel sheet has a yield strength above or equal to 1000 MPa.

Preferably, the steel sheet according to the invention has a LME index of less than 0.36.

Preferably, the steel sheet according to the invention has a carbon equivalent Ceq lower than 0.4%, the carbon equivalent being defined as $$Ceq = C\,\% + Si\,\%/55 + Cr\,\%/20 + Mn\,\%/19 - Al\,\%/18 + 2.2P\,\% - 3.24B\,\% - 0.133{*}Mn\,\%{*}Mo\,\%$$

with elements being expressed by weight percent.

Preferably, the resistance spot weld of two steel parts of the steel sheet according to the invention has an α value of at least 30 daN/mm2.

The present invention provides a cold rolled, annealed and partitioned steel sheet, made of a steel having a composition comprising, by weight percent:

C: 0.05-0.18%
Mn: 6.0-11.0%
Mo: 0.05-0.5%
B: 0.0005-0.005%
S≤0.010%
P≤0.020%
N≤0.008% and comprising optionally one or more of the following elements, in weight percentage:

Al: <3%
Si≤1.20%
Ti≤0.050%
Nb≤0.050%
Cr≤0.5%
V≤0.2% the remainder of the composition being iron and unavoidable impurities resulting from the smelting, said steel sheet having a microstructure comprising, in surface fraction,

- from 0% to 30% of ferrite, such ferrite, when present, having a grain size below 1.0 μm,
- from 8% to 40% of retained austenite, the fraction of austenite islands with a size above 0.5 μm being below or equal to 5%,
- from 30 to 92% of partitioned martensite,
- less than 3% of fresh martensite,
- a carbon $[C]_A$ and manganese $[Mn]_A$ content in austenite, expressed in weight percent, such that the ratio $([C]_A^2 \times [Mn]_A)/(C\,\%^2 \times Mn\,\%)$ is below 18.0, C % and Mn % being the nominal values in carbon and manganese in weight %.

DETAILED DESCRIPTION

Figure 1:
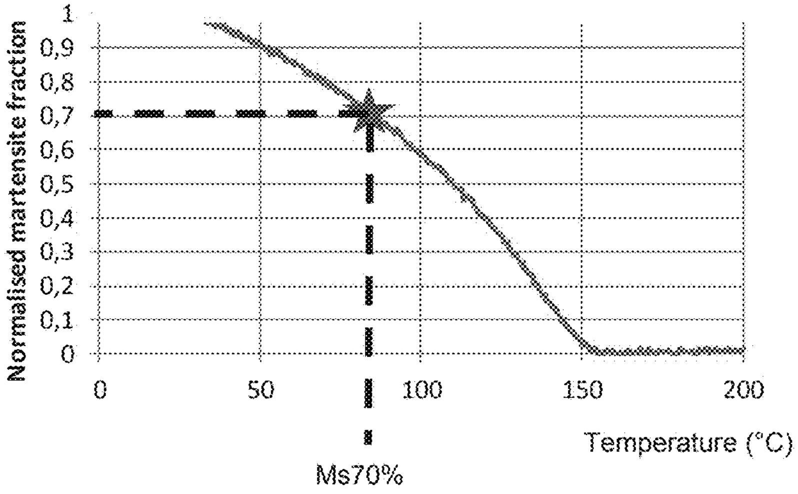
FIG. 1 shows a graph of normalized martensite fraction with respect to temperature.

The invention will now be described in detail and illustrated by examples without introducing limitations.

According to the invention the carbon content is from 0.05% to 0.18% to ensure a satisfactory strength and good weldability properties. Above 0.18% of carbon, weldability of the steel sheet and the resistance to LME may be reduced. The temperature of the soaking depends on carbon content: the higher the carbon content, the lower the soaking temperature to stabilize austenite. If the carbon content is lower than 0.05%, the strength of the partitioned martensite is not enough to get UTS above 1270 MPa. In a preferred embodiment of the invention, the carbon content is from 0.08% to 0.15%. In another preferred embodiment of the invention, the carbon content is from 0.10 to 0.15%.

The manganese content is comprised from 6.0% to 11.0%. Above 11.0% of addition, weldability of the steel sheet may be reduced, and the productivity of parts assembly can be reduced. Moreover, the risk of central segregation increases to the detriment of the mechanical properties. As the temperature of soaking depends on manganese content too, the minimum of manganese is defined to stabilize austenite, to obtain, after soaking, the targeted microstructure and strengths. Preferably, the manganese content is from 6.0% to 9%.

According to the invention, aluminium content is below 3% to decrease the manganese segregation during casting. Aluminium is a very effective element for deoxidizing the steel in the liquid phase during elaboration. Above 3% of addition, the weldability of the steel sheet may be reduced, so as castability. Moreover, tensile strength above 1270 MPa is difficult to achieve. Moreover, the higher the aluminium content, the higher the soaking temperature to stabilize austenite. Aluminium is preferably added at least up to 0.2% to improve product robustness by enlarging the intercritical range, and to improve weldability. Moreover, aluminium can be added to avoid the occurrence of inclusions and oxidation problems. In a preferred embodiment of the invention, the aluminium content is from 0.2% to 2.2% and more preferably from 0.7 and 2.2%.

The molybdenum content is from 0.05% to 0.5% to decrease the manganese segregation during casting. Moreover, an addition of at least 0.05% of molybdenum provides resistance to brittleness. Above 0.5%, the addition of molybdenum is costly and ineffective in view of the properties which are required. In a preferred embodiment of the invention, the molybdenum content is from 0.15% to 0.35%.

According to the invention, the boron content is from 0.0005% to 0.005% to improve the toughness of the hot rolled steel sheet and the spot weldability of the cold rolled steel sheet. Above 0.005%, the formation of boro-carbides at the prior austenite grain boundaries is promoted, making the steel more brittle. In a preferred embodiment of the invention, the boron content is from 0.001% to 0.003%.

Optionally some elements can be added to the composition of the steel according to the invention.

The maximum addition of silicon content is limited to 1.20% to improve LME resistance. In addition, this low silicon content makes it possible to simplify the process by eliminating the step of pickling the hot rolled steel sheet before the hot band annealing. Preferably the maximum silicon content added is 1.0%.

Titanium can be added up to 0.050% to provide precipitation strengthening. Preferably, a minimum of 0.010% of titanium is added in addition of boron to protect boron against the formation of BN.

Niobium can optionally be added up to 0.050% to refine the austenite grains during hot-rolling and to provide precipitation strengthening. Preferably, the minimum amount of niobium added is 0.010%.

Chromium and vanadium can optionally be respectively added up to 0.5% and 0.2% to provide improved strength.

The remainder of the composition of the steel is iron and impurities resulting from the smelting. In this respect, P, S and N at least are considered as residual elements which are unavoidable impurities. Their content is less than or equal to 0.010% for S, less than or equal to 0.020% for P and less than or equal to 0.008% for N.

The microstructure of the steel sheet according to the invention will now be described. It contains, in surface fraction:

- from 0% to 30% of ferrite, such ferrite, when present, having a grain size below 1.0 μm,
- from 8% to 40% of retained austenite, the fraction of austenite islands with a size above 0.5 μm being below or equal to 5%,
- from 30 to 92% of partitioned martensite
- less than 3% of fresh martensite,
- a carbon $[C]_A$ and manganese $[Mn]_A$ content in austenite, expressed in weight percent, such that the ratio $([C]_A^2\times[Mn]_A)/(C\ \%^2\times Mn\ \%)$ is below 18.0, C % and Mn % being the nominal values in carbon and manganese in weight %.

The microstructure of the steel sheet according to the invention contains from 8% to 40% of retained austenite. Below 8% or above 40% of austenite, the uniform and total elongations UE and TE can not reach the respective minimum values of 10.0% and 14.0%.

Such austenite is formed during the intercritical annealing of the hot-rolled steel sheet but also during the annealing of the cold rolled steel sheet. During the intercritical annealing of the hot rolled steel sheet, areas containing a manganese content higher than nominal value and areas containing manganese content lower than nominal value are formed, creating a heterogeneous distribution of manganese. Carbon co-segregates with manganese accordingly. This manganese heterogeneity is measured thanks to the slope of manganese distribution for the hot rolled steel sheet, which must be above or equal to −50, as shown on FIG. 3 and explained later.

The carbon $[C]_A$ and manganese $[Mn]_A$ contents in austenite, expressed in weight percent, are such that the ratio $([C]_A^2\times[Mn]_A)/(C\ \%^2\times Mn\ \%)$ is below 18.0. When the ratio is above 18.0, the retained austenite is too stable to provide a sufficient TRIP-TWIP effect during deformation. Such TWIP-TRIP effect is notably explained in "Observation-of-the-TWIP-TRIP-Plasticity-Enhancement-Mechanism-in-Al-Added-6-Wt-Pct-Medium-Mn-Steel", DOI: 10.1007/s11661-015-2854-z, The Minerals, Metals & Materials Society and ASM International 2015, p. 2356 Volume 46A, June 2015 (S. LEE, K. LEE, and B. C. DE COOMAN).

Moreover, the fraction of austenite islands with a size above 0.5 μm has to be kept below or equal to 5% to ensure that the hole expansion ratio will remain at least equal to 15%. Indeed, such big austenite islands are not stable enough.

The microstructure of the steel sheet according to the invention contains from 0 to 30% of ferrite such ferrite, when present, having a grain size below 1.0 μm. Such ferrite can be formed during the annealing of the cold rolled steel sheet, when it takes place at a temperature from Ac1 to Ac3 of the cold rolled steel sheet. When the annealing of the cold rolled steel sheet takes place above Ac3 of the cold rolled steel sheet, no ferrite is present. Preferably the ferrite content is comprised from 0% to 25%.

The microstructure of the steel sheet according to the invention contains from 30 to 92% of partitioned martensite. Such martensite is mostly formed upon cooling after the annealing of the cold rolled steel sheet and then gets partitioned during the partitioning of the cold rolled steel sheet.

Fresh martensite can be present below 3% in surface fraction but is not a phase that is desired in the microstructure of the steel sheet according to the invention. It can be formed during the final cooling step to room temperature by transformation of unstable austenite. Indeed, this unstable austenite with low carbon and manganese contents leads to a martensite start temperature Ms above 20° C. To obtain the final mechanical properties, the fresh martensite has to be below 3% and preferably below 2% or even better reduced down to 0%.

Partitioned martensite can be distinguished from fresh martensite on a section polished and etched with a reagent known per se, for example Nital reagent, observed by Scanning Electron Microscopy (SEM) or on a section polished, analysed by Electron Backscatter Diffraction (EBSD). Partitioned martensite has an average C content strictly lower than the nominal C content of the steel. This low C content results from the partitioning of carbon from the martensite, created upon quenching below the Ms temperature of the steel, to the austenite, during the holding at a partitioning temperature $T_P$.

By contrast, the fresh martensite, which results from the transformation of carbon enriched austenite into martensite after the partitioning step, has a C content higher than the nominal carbon content of the steel and a dislocation density higher than the partitioned martensite. In a first embodiment, the microstructure comprises from 5% to 25% of ferrite, from 15% to 30% of retained austenite and from 45% to 80% of partitioned martensite.

In another embodiment, the microstructure comprises no ferrite, from 20% to 30% of retained austenite and from 70% to 80% of partitioned martensite.

The steel sheet according to the invention has a tensile strength TS above or equal to 1270, a uniform elongation UE above or equal to 10.0%, a total elongation TE above or equal to 14.0%, a hole expansion ratio of at least 15% and satisfies the equation (TS×TE)/(% C+% Si/4)>50 000 MPa.%.

Preferably, the steel sheet has a yield strength above or equal to 1000 MPa.

Preferably, the cold rolled and annealed steel sheet has a LME index below 0.36.

Preferably, the steel sheet has a carbon equivalent Ceq lower than 0.4% to improve weldability. The carbon equivalent is defined as Ceq=C %+Si %/55+Cr %/20+Mn %/19−Al %/18+2.2P %−3.24B %−0.133*Mn %*Mo %, with elements being expressed by weight percent.

A welded assembly can be manufactured by producing two parts out of sheets of steel according to the invention, and then perform resistance spot welding of the two steel parts.

The resistance spot welds joining the first sheet to the second sheet are characterized by a high resistance in cross-tensile test defined by an α value of at least 30 daN/mm2.

The steel sheet according to the invention can be produced by any appropriate manufacturing method and the person skilled in the art can define one. It is however preferred to use the method according to the invention comprising the following steps:

A semi-product able to be further hot-rolled is provided with the steel composition described above. The semi product is heated to a temperature from 1150° C. to 1300° C., so to make it possible to ease hot rolling, with a final hot rolling temperature FRT from 800° C. to 1000° C. Preferably, the FRT is from 850° C. to 950° C.

The hot-rolled steel is then cooled and coiled at a temperature $T_{coil}$ from 20° C. to 600° C., and preferably from 300 to 500° C.

The hot rolled steel sheet is then cooled to room temperature and can be pickled.

The hot rolled steel sheet is then annealed to an annealing temperature $T_{HBA}$ between Ac1 and Ac3. More precisely, $T_{HBA}$ is chosen to minimize the area fraction of precipitated carbides below 0.8% and to promote manganese inhomogeneous repartition. This manganese heterogeneity is measured thanks to the slope of manganese distribution for the hot rolled steel sheet, which must be above or equal to −50. Preferably the temperature $T_{HBA}$ is from Ac1+5° C. to Ac3. Preferably the temperature $T_{HBA}$ is from 580° C. to 680° C.

The steel sheet is maintained at said temperature $T_{HBA}$ for a holding time $t_{HBA}$ from 0.1 to 120 h to promote manganese diffusion and formation of inhomogeneous manganese distribution. Moreover, this heat treatment of the hot rolled steel sheet allows decreasing the hardness while maintaining the toughness of the hot-rolled steel sheet.

The hot rolled and heat-treated steel sheet is then cooled to room temperature and can be pickled to remove oxidation.

The hot rolled and heat-treated steel sheet is then cold rolled at a reduction rate from 20% to 80%.

The cold rolled steel sheet is then submitted to an annealing at a temperature $T_{soak}$ from T1 to 930° C. for a holding time $t_{soak}$ of 3 s to 1000 s, T1 being the temperature at which 30% of ferrite, in surface fraction, is formed at the end of the soaking. When $T_{soak}$ is higher than 930° C., not enough austenite can be stabilized at room temperature. Preferably, $T_{soak}$ is from 720 to 900° C. and more preferably from 720° C. to 870° C. and the time $t_{soak}$ is from 100 to 1000 s. Such annealing can be performed by continuous annealing.

The cold rolled and annealed steel sheet is then quenched down to Tq, which is set in the range from (Ms70%-75) to (Ms70%-20). Ms70% is the temperature at which the steel sheet reaches a content in martensite of 70% through this quenching operation. This value is determined by drawing the martensite transformation kinetics curve during cooling to room temperature, thanks to dilatometry tests performed on samples that are cooled to room temperature and reheated up to 120° C. As shown on FIG. 1, the value corresponding to a percentage of martensite of 70% (normalized to 0.7 as compared to 1 at room temperature) is defined as Ms70%.

Such quenching occurs at an average cooling rate of at least 0.1° C./s and preferably of at least 1° C./s. Part of the austenite present at the end of the soaking will be turned into fresh martensite, the precise proportion depending on the value of Tq.

After quenching, the steel sheet is then submitted to a partitioning step at a temperature Tp from 300 to 550° C.

during a time tp from 5 to 1000 s. Preferably, $T_p$ is from 350 to 500° C. and $t_p$ is from to 100 to 300 s.

The fresh martensite is transformed into partitioned martensite at the end of this partitioning step. The austenite is further enriched in carbon.

The cold rolled, annealed and partitioned steel sheet is then cooled to room temperature and a small proportion of fresh martensite may be formed during such cooling. The sheet can then be coated by any suitable process including hot-dip coating, electrodeposition or vacuum coating of zinc or zinc-based alloys or of aluminium or aluminium-based alloys.

In another embodiment, the above described process can be stopped after the hot rolled sheet annealing, the cold rolling or after coating and the corresponding steel sheets can be cut into blanks that will then be used to manufacture parts by press hardening. If the coating occurs by hot dip coating, it is usually preferable to perform an annealing to prepare the surface of the sheet just before dipping it in the hot melt bath.

Such press hardening operation consists in an austenitisation step wherein the steel blank is heated in an oven to a temperature going from T1 to 930° C., similarly to the annealing described above for the cold rolled steel sheet. Preferably, this austenitisation temperature is from 720 to 900° C. and more preferably from 720° C. to 870° C. and the austenitisation time is from 30 to 1000 s. The heated blank is then transferred to a hot stamping die where the hot stamping takes place.

The part is then maintained into the die while hardening takes place through a quenching operation in a manner known by the person skilled in the art. The quenching is performed so as to reach a cooling rate of at least 0.1° C./s until reaching a temperature Tq from (Ms70%-75) to (Ms70%-20). During this quenching, the part will acquire the same microstructure as the one targeted for the cold rolled and annealed steel sheet.

The steel part is then transferred to an oven, usually within 2 to 100 s, to be submitted to a partitioning operation that requires to reheat the part at a temperature Tp for a holding time tp, Tp ranging from 300 to 550° C. and tp from 2 to 1000 s. Preferably, Tp is from 350 to 500° C. and tp is from to 100 to 300 s. The part will then acquire the same microstructure as the one targeted for the cold rolled, annealed and partitioned steel sheet.

The invention will be now illustrated by the following examples, which are by no way limitative.

Example 1—Steel Sheet for Cold Forming

Six grades, whose compositions are gathered in table 1, were cast in semi-products and processed into steel sheets.

Table 1—Compositions

The tested compositions are gathered in the following table wherein the element contents are expressed in weight percent.

| Steel | C | Mn | Al | Mo | B | S | P | N | Si | Nb | Ti | Ac1 (°C) | Ac3 (°C) | Ms (°C) | Ceq |
|---|---|---|---|---|---|---|---|---|---|---|---|---|---|---|---|
| A | 0.16 | 7.7 | 0.96 | 0.22 | 0.0028 | 0.002 | 0.012 | 0.002 | 0.809 | 0.018 | — | 560 | 830 | 231 | 0.35 |
| B | 0.15 | 7.0 | 0.03 | 0.20 | 0.002 | 0.002 | 0.011 | 0.004 | 0.295 | 0.022 | — | 550 | 750 | 263 | 0.35 |
| C | 0.19 | 3.9 | 0.39 | 0.20 | 0.0021 | 0.001 | 0.011 | 0.003 | 1.270 | 0.02 | 0.029 | 650 | 840 | 325 | 0.32 |
| D | 0.17 | 3.8 | 0.757 | 0.20 | - | 0.001 | 0.013 | 0.008 | 1.520 | 0.03 | 0 | 650 | 900 | 330 | 0.31 |
| E | 0.21 | 4.0 | 0.034 | 0.001 | - | 0.001 | 0.011 | 0.003 | 1.500 | — | — | 665 | 790 | 315 | 0.47 |

Underlined values: out of the invention

Ac1. Ac3 and Ms temperatures of the cold-rolled sheet have been determined through dilatometry tests and metallography analysis.

Table 2—Process Parameters of the Hot Rolled and Heat-Treated Steel Sheets

Steel semi-products, as cast, were reheated at 1200° C., hot rolled and then coiled. The hot rolled and coiled steel sheets are then heat treated at a temperature $T_{HBA}$ and maintained at said temperature for a holding time $t_{HBA}$. The following specific conditions to obtain the hot rolled and heat-treated steel sheets were applied:

| Trials | Steel | Hot rolling FRT (°C) | Coiling CT (°C) | Hot band annealing (HBA) $T_{HBA}$(°C) | $t_{HBA}$(h) |
|---|---|---|---|---|---|
| 1 | A | 900 | 450 | 640 | 10 |
| 2 | A | 900 | 450 | 640 | 10 |
| 3 | A | 900 | 450 | 640 | 10 |
| 4 | A | 900 | 450 | 640 | 10 |
| 5 | A | 900 | 450 | 640 | 10 |
| 6 | A | 900 | 450 | 640 | 10 |
| 7 | A | 900 | 450 | 640 | 10 |
| 8 | A | 900 | 450 | 640 | 10 |
| 9 | B | 850 | 450 | 650 | 40 |
| 10 | B | 850 | 450 | 650 | 40 |
| 11 | B | 850 | 450 | 650 | 40 |
| 12 | B | 850 | 450 | 650 | 40 |
| 13 | C | 850 | 450 | 630 | 17 |
| 14 | D | 900 | 450 | 600 | 5 |
| 15 | E | 900 | 30 | 600 | 6 |
| 16 | A | 900 | 450 | 640 | 10 |
| 17 | A | 900 | 450 | 640 | 10 |

Underlined values: parameters which do not allow to obtain the targeted properties The hot rolled and heat-treated steel sheets were analyzed, and the corresponding properties are gathered in table 3.

Table 3—Microstructure and Properties of the Hot Rolled and Heat-Treated Steel Sheet The slope of the manganese distribution and the fraction of precipitated carbides were determined.

The fraction of precipitated carbides is determined thanks to a section of sheet examined through Scanning Electron Microscope with a Field Emission Gun ("FEG-SEM") and image analysis at a magnification greater than 15000×.

The heat treatment of the hot rolled steel sheet allows manganese to diffuse in austenite: the repartition of manganese is heterogeneous with areas with low manganese content and areas with high manganese content. This manganese heterogeneity helps to achieve mechanical properties and can be measured thanks to the manganese profile.

Figure 2:
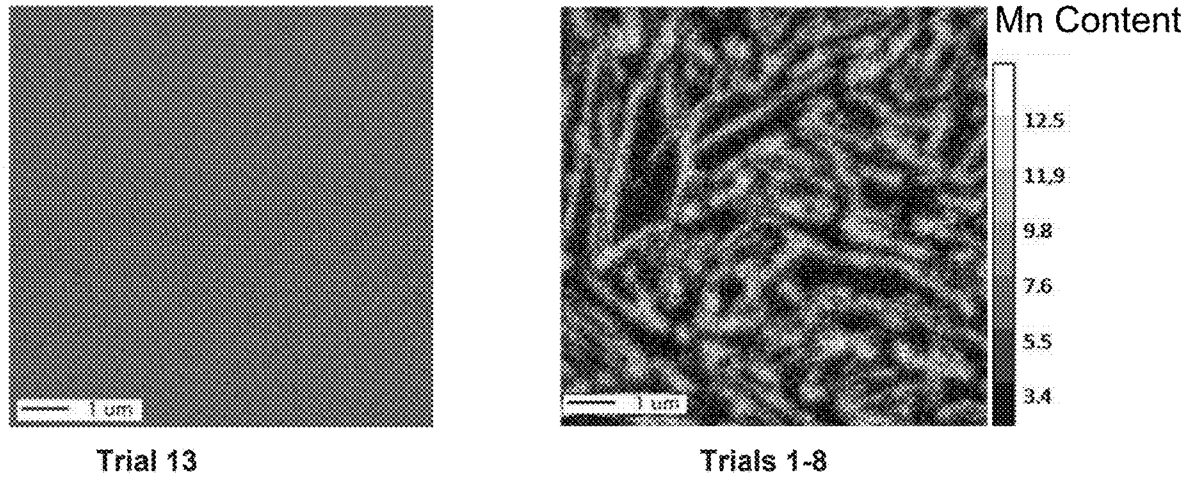
FIG. 2 shows a section of the hot rolled and heat-treated steel sheet of trial 13 and trials 1-8.

FIG. 2 represents a section of the hot rolled and heat-treated steel sheet of trial 13 and trials 1-8. The black area corresponds to area with lower amount of manganese, the grey area corresponds to a higher amount of manganese.

This figure is obtained through the following method: a specimen is cut at 4 thickness from the hot rolled and heat-treated steel sheet and polished.

The section is afterwards characterized through electron probe micro-analyzer, with a Field Emission Gun ("FEG") at a magnification greater than 10000× to determine the manganese amounts. Three maps of 10 μm*10 μm of different parts of the section were acquired. These maps are composed of pixels of 0.01 $\mu m^2$. Manganese amount in weight percent is calculated in each pixel and is then plotted on a curve representing the accumulated area fraction of the three maps as a function of the manganese amount.

Figure 3:
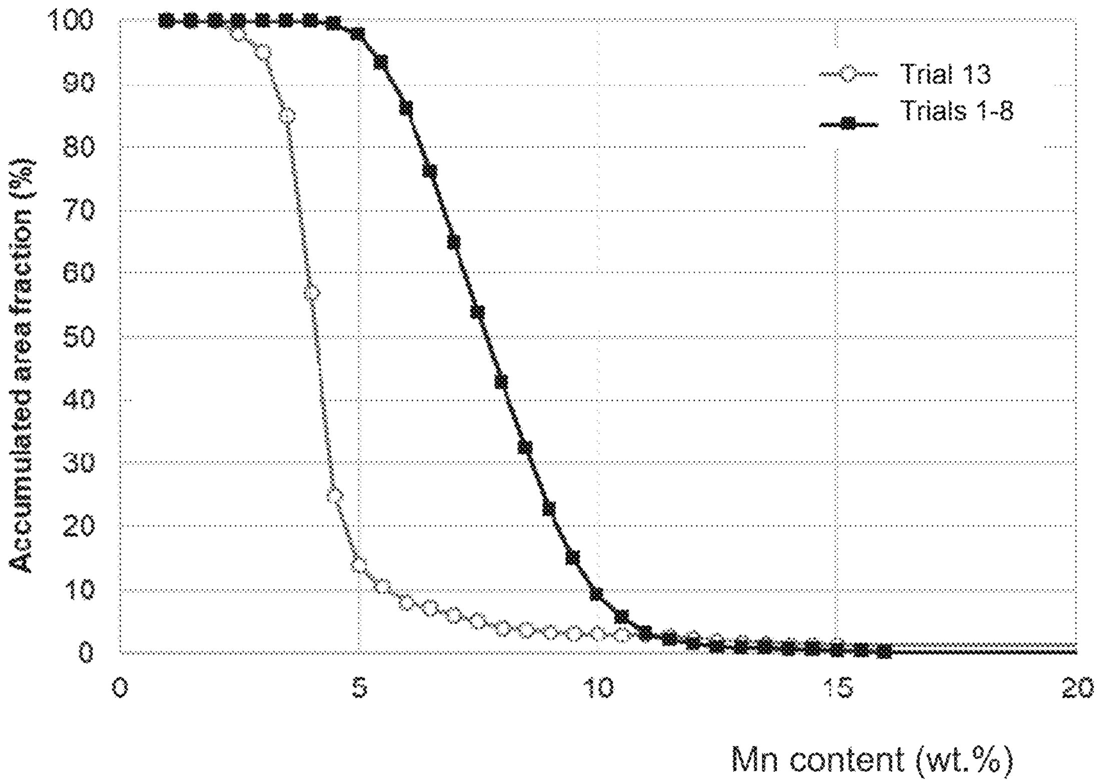
FIG. 3 shows a plotted curve for trial 13 and trials 1-8 of accumulated area fraction with respect to Mn content.

This curve is plotted in FIG. 3 for trial 13 and trials 1-8: 100% of the sheet section contains more than 1% of manganese. For trials 1-8, 10% of the sheet section contains more than 10% of manganese.

The slope of the curve obtained is then calculated between the point representing 80% of accumulated area fraction and the point representing 20% of accumulated area fraction.

For trials 1-8, this slope is higher than −50, showing that the repartition of manganese is heterogeneous, with areas with low manganese content and areas with high manganese content.

On the contrary, for trial 13, the absence of heat treatment after hot rolling implies that the repartition of manganese is not heterogeneous, which can be seen by the value of the slope of the manganese distribution lower than −50.

| Trials | Slope of the Mn distribution | Fraction of precipitated carbides < 0.8% |
|---|---|---|
| 1 | −21 | 0.3 |
| 2 | −21 | 0.3 |
| 3 | −21 | 0.3 |
| 4 | −21 | 0.3 |
| 5 | −21 | 0.3 |
| 6 | −21 | 0.3 |
| 7 | −21 | 0.3 |
| 8 | −21 | 0.3 |
| 9 | −28 | 0.2 |
| 10 | −28 | 0.2 |
| 11 | −28 | 0.2 |
| 12 | −28 | 0.2 |
| 13 | −70 | 2.4 |
| 14 | −70 | 2.1 |
| 15 | −70 | 2.5 |
| 16 | −21 | 0.3 |
| 17 | −21 | 0.3 |

Underlined values: do not match the targeted values.

Table 4—Process Parameters of the Cold Rolled, Annealed and Partitioned Steel Sheets For trials 1 to 15, the hot rolled and heat-treated steel sheet obtained are then cold rolled. The cold rolled steel sheet are then first annealed at a temperature $T_{soak}$ and maintained at said temperature for a holding time $t_{soak}$, before being quenched at Tq at a cooling speed of 2° C./s. The steel sheet is then heated a second time at a temperature Tp and maintained at said temperature for a holding time tp, before being cooled to room temperature.

The following specific conditions to obtain the cold rolled and annealed steel sheets were applied:

| Trials | Cold rolling (%) | Annealing $T_{soak}$ (°C) | Annealing $t_{soak}$(s) | Quenching Tq (°C) | Partitioning Tp (°C) | Partitioning tq(s) | Ms70% (°C) |
|---|---|---|---|---|---|---|---|
| 1 | 50 | 830 | 120 | 100 | 450 | 250 | 123 |
| 2 | 50 | 830 | 120 | 70 | 450 | 250 | 123 |
| 3 | 50 | 830 | 120 | 60 | 450 | 100 | 123 |
| 4 | 50 | 800 | 120 | 90 | 450 | 250 | 107 |
| 5 | 50 | 800 | 120 | 30 | 400 | 250 | 107 |
| 6 | 50 | 780 | 120 | 70 | 450 | 250 | 86 |
| 7 | 50 | 780 | 120 | 40 | 450 | 250 | 86 |
| 8 | 50 | 750 | 120 | 30 | 450 | 250 | 45 |
| 9 | 50 | 780 | 120 | 80 | 440 | 220 | 98 |
| 10 | 50 | 820 | 120 | 90 | 440 | 220 | 105 |
| 11 | 50 | 850 | 120 | 62 | 440 | 220 | 130 |
| 12 | 50 | 850 | 120 | 100 | 440 | 220 | 130 |
| 13 | 50 | 820 | 140 | 180 | 440 | 240 | nd |
| 14 | 50 | 840 | 100 | 140 | 400 | 220 | nd |
| 15 | 50 | 830 | 30 | 170 | 450 | 120 | nd |

Underlined values: parameters which do not allow to obtain the targeted properties Nd: not determined The cold rolled and annealed sheets were then analyzed, and the corresponding microstructure elements, mechanical properties and weldability properties were respectively gathered in table 5, 6 and 7.

Table 5—Microstructure of the Cold Rolled, Annealed and Partitioned Steel Sheet

The phase percentages of the microstructures of the obtained cold rolled and partitioned steel sheet were determined.

$[C]_A$ and $[Mn]_A$ corresponds to the amount of carbon and manganese in austenite, in weight percent. They are measured with both X-rays diffraction (C %) and electron probe micro-analyzer, with a Field Emission Gun (Mn %).

The surface fractions of phases in the microstructure are determined through the following method: a specimen is cut from the cold rolled and annealed steel sheet, polished and etched with a reagent known per se, to reveal the microstructure. The section is afterwards examined through scanning electron microscope, for example with a Scanning Electron Microscope with a Field Emission Gun ("FEG-SEM") at a magnification greater than 5000×, in secondary electron mode.

The determination of the surface fraction of ferrite is performed thanks to SEM observations after Nital or Picral/Nital reagent etching.

The determination of the volume fraction of retained austenite is performed thanks to X-ray diffraction.

| Trials | Ferrite (%) | Ferrite size (μm) | Residual austenite (%) | $[C]_A$ (% wt) | $[Mn]_A$ (% wt) | $[C]_A^2 \times [Mn]_A / C\%^2 \times Mn\%$ | Fraction of austenite islands > 0.5 μm (%) | Partitioned martensite (%) | Fresh martensite (%) |
|---|---|---|---|---|---|---|---|---|---|
| 1 | 0 | — | 24 | 0.39 | 8.9 | 7.3 | 4 | 76 | 0 |
| 2 | 0 | — | 23 | 0.41 | 8.9 | 8.0 | 3 | 77 | 0 |
| 3 | 0 | — | 23 | 0.41 | 8.9 | 8.0 | 3 | 77 | 0 |
| 4 | 5 | 0.4 | 23 | 0.42 | 9.3 | 8.8 | 10 | 72 | 0 |

-continued

| Trials | Ferrite (%) | Ferrite size (μm) | Residual austenite (%) | $[C]_A$ (% wt) | $[Mn]_A$ (% wt) | $[C]_A^2 \times [Mn]_A$/ C $\%^2$ × Mn % | Fraction of austenite islands > 0.5 μm (%) | Partitioned martensite (%) | Fresh martensite (%) |
|---|---|---|---|---|---|---|---|---|---|
| 5 | 5 | 0.4 | 15 | 0.61 | 9.5 | 19.0 | 4 | 80 | 0 |
| 6 | 10 | 0.5 | 26 | 0.38 | 9.5 | 7.4 | 11 | 64 | 0 |
| 7 | 10 | 0.5 | 22 | 0.42 | 9.6 | 9.1 | 5 | 68 | 0 |
| 8 | 25 | 0.6 | 22 | 0.43 | 10.0 | 9.9 | 9 | 53 | 0 |
| 9 | 0 | — | 33 | 0.3 | 8.0 | 4.5 | 8 | 67 | 0 |
| 10 | 0 | — | 31 | 0.31 | 7.9 | 4.7 | 7 | 69 | 0 |
| 11 | 0 | — | 24 | 0.40 | 7.8 | 7.8 | 2 | 76 | 0 |
| 12 | 0 | — | 30 | 0.33 | 7.7 | 5.2 | 4 | 70 | 0 |
| 13 | 15 | 1.3 | 12 | nd | nd | nd | 9 | 67 | 6 |
| 14 | 32 | 0.8 | 18 | nd | nd | nd | 4 | 47 | 3 |
| 15 | 0 | — | 14 | nd | nd | nd | 4 | 81 | 5 |

Underlined values: not corresponding to the invention,
nd: not determined

Underlined values: not corresponding to the invention, nd: not determined

Table 6—Mechanical Properties of the Cold Rolled, Annealed and Partitioned Steel Sheet Mechanical properties of the obtained cold rolled, annealed and partitioned steel sheets were determined and gathered in the following table.

The yield strength YS, the tensile strength TS and the uniform and total elongation UE, TE are measured according to ISO standard ISO 6892-1, published in October 2009. The test for hole expansion ratio is conducted in accordance with ISO 16630 standards.

| Trials | TS (MPa) | UE (%) | TE (%) | HE (%) | (UTSxTE)/ (C% + Si %/4) (MPa. %) | YS (MPa) |
|---|---|---|---|---|---|---|
| 1 | 1413 | 12.7 | 15.3 | 16.1 | 60346 | 1072 |
| 2 | 1375 | 12.6 | 16.9 | 19.4 | 64672 | 1240 |
| 3 | 1350 | 11.2 | 15.2 | 22.8 | 57278 | 1292 |
| 4 | 1441 | 12.4 | 16.7 | 7.4 | 66972 | 1131 |
| 5 | 1405 | 1.9 | 6.2 | 35.8 | 24307 | 1352 |
| 6 | 1404 | 13.0 | 15.4 | 6.8 | 60353 | 1141 |
| 7 | 1368 | 11.7 | 16.7 | 15.1 | 63579 | 1276 |
| 8 | 1408 | 14.5 | 18.3 | 6.7 | 71923 | 893 |
| 9 | 1507 | 13.1 | 16.4 | 10.1 | 68373 | 1143 |
| 10 | 1456 | 13.5 | 16.3 | 8.1 | 65856 | 1192 |
| 11 | 1411 | 11.9 | 17.0 | 17.5 | 66365 | 1299 |
| 12 | 1420 | 12.5 | 15.7 | 15.0 | 61688 | 1152 |
| 13 | 1290 | 8.4 | 12.3 | 30.0 | 31204 | 1165 |
| 14 | 1320 | 11.6 | 15.9 | 24.0 | 37884 | 1074 |
| 15 | 1350 | 11.1 | 15.3 | 29.0 | 35612 | 1226 |

Underlined values: do not match the targeted values

Trials 4, 6, 9 and 10 were submitted to a quenching temperature Tq which is too high, leading to the formation of a high fraction of big austenite islands that are not stable enough, thus the hole expansion ratio degrades.

Trial 5 was submitted to quenching temperature Tq which is too low, leading to the generation of austenite that is too stable during deformation as shown by the value of $[C]_A^2 \times [Mn]_A/C\ \%^2 \times Mn\ \%$. This triggers total and uniform elongation values that are too low.

Trial 8 was submitted to a soaking temperature above T1, but Tq was too high, leading notably to the formation of a high fraction of big austenite islands, that are not stable enough. Together with the relatively high fraction of ferrite, this results in a strong decrease of the hole expansion ratio.

Trial 13 was made from a composition which does not contain enough manganese and was submitted to a hot band annealing at a too low temperature. The resulting microstructure is composed of ferrite and carbides with a relatively homogeneous manganese distribution in ferrite. Moreover, the relatively low soaking leads to an insufficient dissolution of carbides. The large ferrite grain size after annealing of the cold rolled steel sheet is inherited from the very big ferrite size formed during hot band batch annealing. The carbides cannot prevent the abnormal grain growth of ferrite during hot band batch annealing. The grain size of ferrite is therefore too high, and the retained austenite fraction and mechanical stability are decreased which triggers a decrease in uniform and total elongations.

Trials 14 and 15, which composition does not contain enough manganese, was submitted to a hot band annealing at a too low temperature. The resulting microstructure is composed of ferrite and carbides with a relatively homogeneous manganese distribution in ferrite. The quenched and partitioned sheet is not showing a good compromise between mechanical properties and LME resistance, as evidenced by the low value of (UTS×TE)/(C %+Si %/4).

Table 7—Weldability Properties of the Cold Rolled, Annealed and Partitioned Steel Sheet Spot welding in standard ISO 18278-2 condition was done on the cold rolled, annealed and partitioned steel sheets.

In the test used, the samples are composed of two sheets of steel in the form of cross welded equivalent. A force is applied so as to break the weld point. This force, known as cross tensile Strength (CTS), is expressed in daN. It depends on the diameter of the weld point and the thickness of the metal, that is to say the thickness of the steel and the metallic coating. It makes it possible to calculate the coefficient α which is the ratio of the value of CTS on the product of the diameter of the welded point multiplied by the thickness of the substrate. This coefficient is expressed in $daN/mm^2$.

Weldability properties of the cold rolled, annealed and partitioned were determined and gathered in the following table:

| Trials | α ($daN/mm^2$) | LME index |
|---|---|---|
| 1 | 40 | 0.16 |
| 2 | 38 | 0.36 |
| 3 | 38 | 0.36 |
| 4 | 38 | 0.36 |
| 5 | 38 | 0.36 |
| 6 | 38 | 0.36 |

-continued

| Trials | α (daN/mm$^2$) | LME index |
|---|---|---|
| 7 | 38 | 0.36 |
| 8 | 38 | 0.36 |
| 9 | 38 | 0.36 |
| 10 | 35 | 0.36 |
| 11 | 35 | 0.36 |
| 12 | 35 | 0.36 |
| 13 | 35 | 0.36 |
| 14 | 35 | 0.36 |
| 15 | 35 | 0.36 |
| 16 | 56 | 0.51 |
| 17 | 75 | 0.55 |
| 18 | 32 | 0.58 |

LME index = C % + Si %/4, in wt %.
Nd: not determined

Example 2—Press Hardened Part

For trials 16 and 17, the hot rolled and heat-treated steel sheet obtained are then cold rolled. The cold rolled steel sheet are then annealed at 860° C. during 100 s to prepare the surface of the sheets for further coating in an aluminium based hot dip bath.

After solidification of the coating and cooling down to room temperature, the steel sheets are cut into blanks. Such blanks are then put in a furnace where they are annealed at a temperature $T_{soak}$ and maintained at said temperature for a holding time $t_{soak}$. They are then transferred to a press hardening die where they are stamped into parts and quenched at Tq at a cooling speed of 2° C./s.

The steel parts are then transferred in a furnace again where they are heated a second time at a temperature Tp and maintained at said temperature for a holding time tp, before being cooled to room temperature. The following specific conditions to obtain the steel parts were applied:

| | Cold rolling | Annealing | | Quenching | Partitioning | | Ms70 % |
|---|---|---|---|---|---|---|---|
| Trials | (%) | $T_{soak}$(°C) | $t_{soak}$(s) | Tq(°C) | Tp(°C) | tq(s) | (°C) |
| 16 | 50 | 750 | 120 | 30 | 450 | 220 | 40 |
| 17 | 50 | 780 | 120 | 70 | 450 | 250 | 80 |

The phase percentages of the microstructures of the obtained steel parts were determined:

| Trials | Ferrite (%) | Ferrite size (μm) | Residual austenite (%) | $[C]_A$ (% wt) | $[Mn]_A$ (% wt) | $[C]_A^2 \times [Mn]_A$/ C %$^2$ × Mn % | Fraction of austenite islands > 0.5 μm (%) | Partitioned martensite (%) | Fresh martensite (%) |
|---|---|---|---|---|---|---|---|---|---|
| 16 | 30 | 0.4 | 30 | 0.43 | 10.7 | 10.6 | 4 | 40 | 0 |
| 17 | 20 | 0.3 | 27 | 0.45 | 10.0 | 12.7 | 5 | 53 | 0 |

The mechanical properties of the parts were determined and gathered in the following table.

The yield strength YS, the tensile strength TS and the uniform and total elongation UE, TE are measured according to ISO standard ISO 6892-1, published in October 2009. The test for hole expansion ratio is conducted in accordance with ISO 16630 standards.

| Trials | TS (MPa) | UE (%) | TE (%) | HE (%) | (UTSxTE)/ (C % + Si %/4) (MPa. %) | YS (MPa) |
|---|---|---|---|---|---|---|
| 16 | 1365 | 15.5 | 18.7 | 19.3 | 71 251 | 1063 |
| 17 | 1413 | 14.4 | 17.4 | 18 | 68 248 | 1032 |

What is claimed is:

1. A cold rolled, annealed and partitioned steel sheet, made of a steel having a composition comprising, by weight percent:

C: 0.05-0.18%
Mn: 6.0-11.0%
Mo: 0.05-0.5%
B: 0.0005-0.005%
S≤0.010%
P≤0.020%
N≤0.008%
and optionally one or more of the following elements:
Al: <3%
Si≤1.20%
Ti≤0.050%
Nb≤0.050%
Cr≤0.5%
V≤0.20%
a remainder of the composition being iron and unavoidable impurities resulting from processing,
the steel sheet having a microstructure comprising, in surface fraction, from 0% to 30% of ferrite, such ferrite, when present, having a grain size below 1.0 μm, from 8% to 40% of retained austenite, the fraction of austenite islands with a size above 0.5 μm being greater than or equal to 2% and below or equal to 5%, from 30 to 92% of partitioned martensite, less than 3% of fresh martensite, and a carbon $[C]_A$ and manganese $[Mn]_A$ content in austenite, expressed in weight percent, such that the ratio $([C]_A^2 \times [Mn]_A)/(C\,\%^2 \times Mn\,\%)$ is below 18.0, C % and Mn % being the nominal values in carbon and manganese in weight %.

2. The steel sheet as recited in claim 1 wherein the carbon content is from 0.08% to 0.15% by weight percent.

3. The steel sheet as recited in claim 1 wherein the manganese content is from 6.0% to 9% by weight percent.

4. The steel sheet as recited in claim 1 wherein the aluminium content is from 0.2% to 2.2% by weight percent.

5. The steel sheet as recited in claim 1 wherein the microstructure comprises, by surface fraction, from 5% to 25% of ferrite, from 15% to 30% of retained austenite and from 45% to 80% of partitioned martensite.

6. The steel sheet as recited in claim 1 wherein the microstructure comprises, by surface fraction, no ferrite, from 20% to 30% of retained austenite and from 70% to 80% of partitioned martensite.

7. The steel sheet as recited in claim 4 wherein the tensile strength is above or equal to 1270 MPa, the uniform elongation UE is above or equal to 10.0%, the total elongation TE is above or equal to 14.0% and wherein TS, TE and the carbon and silicon contents satisfy the following equation: (TS×TE)/(C %+Si %/4)>50 000 MPa.% wherein C % and Si % refer to the nominal wt % in C and Si of the steel.

8. The steel sheet as recited in claim 1 wherein the hole expansion ratio is above or equal to 15%.

9. The steel sheet as recited in claim 1 wherein the yield strength YS is above or equal to 1000 MPa.

10. The steel sheet as recited in claim 1 wherein the steel sheet has a liquid metal embrittlement (LME) index below 0.36.

11. The steel sheet as recited in claim 1 wherein the steel has a carbon equivalent Ceq lower than 0.4%, the carbon equivalent being defined as $$Ceq=C\%+Si\%/55+Cr\%/20+Mn\%/19-Al\%/18+2.2P\%-3.24B\%-0.133\times Mn\%\times Mo\%$$

with elements being expressed by weight percent.

12. A resistance spot weld of two steel parts made of the cold rolled, annealed and partitioned steel sheet as recited in claim 1, the resistance spot weld having an α value of at least 30 daN/mm$^2$.

13. The steel sheet as recited in claim 1 wherein the hole expansion ratio is above or equal to 15%.

14. The steel sheet as recited in claim 13 wherein the tensile strength is above or equal to 1270 MPa, the uniform elongation UE is above or equal to 10.0%, the total elongation TE is above or equal to 14.0% and wherein TS, TE and the carbon and silicon contents satisfy the following equation: (TS×TE)/(C %+Si %/4)>50 000 MPa.% wherein C % and Si % refer to the nominal wt % in C and Si of the steel.

15. The steel sheet as recited in claim 14 wherein the manganese content is from 7.0% to 9% by weight percent.

16. The steel sheet as recited in claim 15 wherein the annealed is hot band batch annealed.

17. The steel sheet as recited in claim 1 wherein the annealed is hot band batch annealed.

18. A press hardened and partitioned steel part having a composition comprising, by weight percent:

C: 0.05-0.18%
Mn: 6.0-11.0%
Mo: 0.05-0.5%
B: 0.0005-0.005%
S≤0.010%
P≤0.020%
N≤0.008% and optionally one or more of the following elements:

Al: <3%
Si≤1.20%
Ti≤0.050%
Nb≤0.050%
Cr≤0.5%
V≤0.2% a remainder of the composition being iron and unavoidable impurities resulting from processing, and having a microstructure comprising, in surface fraction, from 0% to 30% of ferrite, such ferrite, when present, having a grain size below 1.0 μm, from 8% to 40% of retained austenite, the fraction of austenite islands with a size above 0.5 μm being greater than or equal to 2% and below or equal to 5%, from 30 to 92% of partitioned martensite, less than 3% of fresh martensite, and a carbon $[C]_A$ and manganese $[Mn]_A$ content in austenite, expressed in weight percent, such that the ratio $([C]_A^2\times[Mn]_A)/(C\%^2\times Mn\%)$ is below 18.0, C % and Mn % being the nominal values in carbon and manganese in weight %.

* * * * *